(12) United States Patent
Cohen et al.

(10) Patent No.: US 8,069,416 B2
(45) Date of Patent: Nov. 29, 2011

(54) LEARNING COMPUTER-GENERATED SCREENS BASED ON USER KEY SELECTIONS

(75) Inventors: Gabriel A. Cohen, Raleigh, NC (US); James M. Mathewson, II, Chapel Hill, NC (US); Gerald L. Mitchell, Jr., Raleigh, NC (US); Srinivasan Muralidharan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1125 days.

(21) Appl. No.: 10/845,684

(22) Filed: May 14, 2004

(65) Prior Publication Data

US 2005/0257155 A1    Nov. 17, 2005

(51) Int. Cl.
*G06F 3/00* (2006.01)
*G06F 3/01* (2006.01)
(52) U.S. Cl. ........ 715/745; 715/739; 715/811; 715/854; 715/855; 709/219; 709/231
(58) Field of Classification Search .................. 715/745, 715/811, 812, 737, 739, 854, 855; 707/102, 707/203; 709/219, 231
See application file for complete search history.

(56) References Cited

U.S. PATENT DOCUMENTS

| | | | | |
|---|---|---|---|---|
| 4,827,410 A | * | 5/1989 | Corren | 715/840 |
| 4,905,156 A | * | 2/1990 | Vermesse | 705/411 |
| 4,908,786 A | * | 3/1990 | Kuno et al. | 708/171 |
| 4,918,601 A | * | 4/1990 | Vermesse | 705/411 |
| 4,926,365 A | * | 5/1990 | Hsieh | 361/683 |
| 4,928,244 A | * | 5/1990 | Vermesse | 705/411 |
| 4,928,249 A | * | 5/1990 | Vermesse | 358/1.11 |
| 5,182,796 A | * | 1/1993 | Shibayama et al. | 715/841 |
| 5,247,438 A | * | 9/1993 | Subas et al. | 700/90 |
| 5,262,866 A | * | 11/1993 | Hong | 348/564 |
| 5,285,265 A | * | 2/1994 | Choi | 348/565 |
| 5,321,750 A | * | 6/1994 | Nadan | 380/230 |
| 5,430,491 A | * | 7/1995 | Park | 348/468 |

(Continued)

FOREIGN PATENT DOCUMENTS

JP    7152546 A    6/1995

OTHER PUBLICATIONS

IBM Research Disclosure No. 440193, "Optimizing Host Application Presentation Space Recognition Events Through Boundary Matching", p. 2240, Dec. 2000.

(Continued)

*Primary Examiner* — Nicholas Augustine
(74) *Attorney, Agent, or Firm* — Marcia L. Doubet

(57) ABSTRACT

As a user navigates through a sequence of screens by selecting certain "aid" keys, a graph will be built reflecting the navigation history of the user. When a user requests a certain screen by selecting a particular key, screen data is received from a host on a web server. The screen data for the requested screen is compared to the screen data for the screen(s) in the graph associated with the selected key. If a match is established, the user has visited this screen before and its data has already been converted (e.g., scraped). As such, the screen can be retrieved from storage and served to the user. If, however, a match cannot be established, the requested screen will be converted and stored, and the graph will be updated.

31 Claims, 4 Drawing Sheets

U.S. PATENT DOCUMENTS

| | | | |
|---|---|---|---|
| 5,430,840 A * | 7/1995 | Berg et al. ............... 715/745 |
| 5,432,897 A | 7/1995 | Tatsumi et al. |
| 5,448,263 A * | 9/1995 | Martin ..................... 345/173 |
| 5,493,106 A * | 2/1996 | Hunter ..................... 235/375 |
| 5,581,243 A * | 12/1996 | Ouellette et al. ......... 345/173 |
| 5,592,603 A * | 1/1997 | Arato et al. .............. 715/762 |
| 5,606,702 A * | 2/1997 | Diel et al. ................ 719/329 |
| 5,627,564 A * | 5/1997 | Yang ........................ 715/810 |
| 5,652,628 A * | 7/1997 | Toyoshima et al. ..... 725/56 |
| 5,659,693 A * | 8/1997 | Hansen et al. ........... 715/779 |
| 5,670,972 A * | 9/1997 | Kim ......................... 345/13 |
| 5,675,753 A | 10/1997 | Hansen et al. |
| 5,677,700 A * | 10/1997 | Schwalba et al. ........ 345/7 |
| 5,691,778 A * | 11/1997 | Song ........................ 725/59 |
| 5,712,993 A | 1/1998 | Ichikawa |
| 5,716,384 A * | 2/1998 | Snell ........................ 607/30 |
| 5,760,842 A * | 6/1998 | Song ........................ 348/564 |
| 5,774,859 A * | 6/1998 | Houser et al. ............ 704/275 |
| 5,778,368 A | 7/1998 | Hogan et al. |
| 5,779,566 A * | 7/1998 | Wilens ..................... 473/407 |
| 5,794,224 A * | 8/1998 | Yufik ....................... 706/14 |
| 5,796,967 A * | 8/1998 | Filepp et al. ............. 715/764 |
| 5,812,977 A * | 9/1998 | Douglas ................... 704/275 |
| 5,818,451 A * | 10/1998 | Bertram et al. .......... 715/840 |
| 5,818,800 A * | 10/1998 | Barker ..................... 369/29.02 |
| 5,818,924 A * | 10/1998 | King et al. ............... 379/433.13 |
| 5,825,362 A * | 10/1998 | Retter ...................... 715/854 |
| 5,835,914 A | 11/1998 | Brim |
| 5,838,775 A * | 11/1998 | Montalbano .............. 379/93.23 |
| 5,852,745 A * | 12/1998 | Fontal et al. ............. 710/15 |
| 5,870,319 A * | 2/1999 | Thornton et al. ........ 708/160 |
| 5,872,521 A * | 2/1999 | Lopatukin et al. ....... 340/7.52 |
| 5,969,826 A * | 10/1999 | Dash et al. ............... 358/400 |
| 6,044,398 A | 3/2000 | Marullo et al. |
| 6,104,384 A * | 8/2000 | Moon et al. .............. 345/168 |
| 6,141,000 A * | 10/2000 | Martin ..................... 345/178 |
| 6,141,659 A | 10/2000 | Barker et al. |
| 6,163,312 A * | 12/2000 | Furuya ..................... 345/684 |
| 6,166,778 A * | 12/2000 | Yamamoto et al. ...... 348/569 |
| 6,195,679 B1 * | 2/2001 | Bauersfeld et al. ...... 709/203 |
| 6,232,973 B1 | 5/2001 | Dow et al. |
| 6,243,091 B1 * | 6/2001 | Berstis ..................... 715/839 |
| 6,249,765 B1 * | 6/2001 | Adler et al. .............. 704/500 |
| 6,253,244 B1 | 6/2001 | Moore et al. |
| 6,278,452 B1 | 8/2001 | Huberman et al. |
| 6,346,953 B1 | 2/2002 | Erlikh et al. |
| 6,563,518 B1 | 5/2003 | Gipalo |
| 7,165,070 B2 * | 1/2007 | Page et al. ............... 707/10 |
| 2005/0027495 A1 * | 2/2005 | Matichuk ................. 703/2 |
| 2005/0132018 A1 * | 6/2005 | Milic-Frayling et al. ... 709/213 |
| 2005/0132297 A1 * | 6/2005 | Milic-Frayling et al. ... 715/745 |
| 2005/0257155 A1 * | 11/2005 | Cohen et al. ............. 715/745 |
| 2006/0119616 A1 * | 6/2006 | Park ......................... 345/619 |
| 2006/0200737 A1 * | 9/2006 | Nagatomo ................ 715/500 |

OTHER PUBLICATIONS

IBM Technical Disclosure Bulletin, "Using a Pointer for Host Application", vol. 38, No. 5, May 1995, pp. 369-370.

* cited by examiner

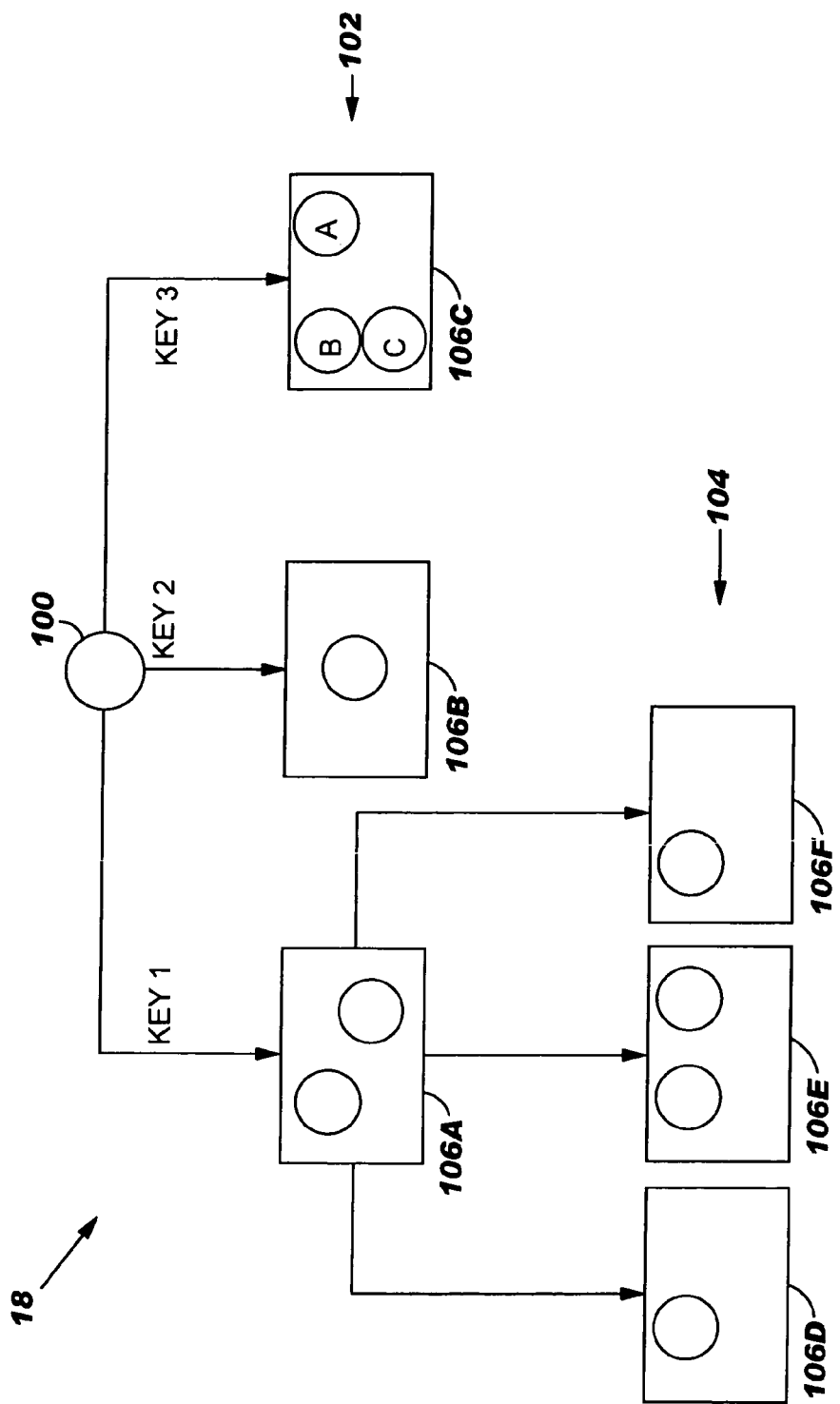

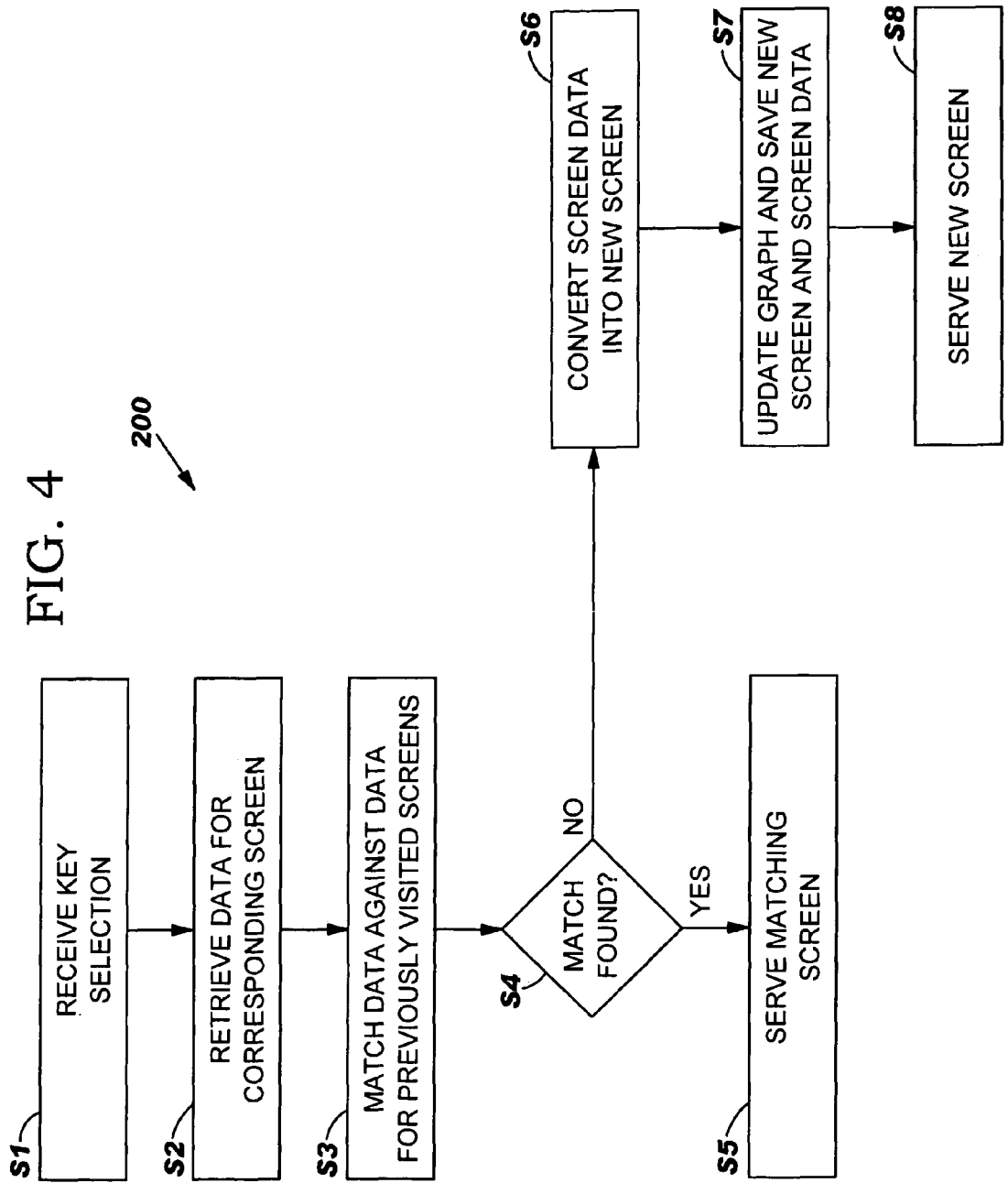

LEARNING COMPUTER-GENERATED SCREENS BASED ON USER KEY SELECTIONS

BACKGROUND OF THE INVENTION

1. Field of the Invention

In general, the present invention relates to a method, system and program product for learning computer-generated screens based on user key selections. Specifically, the present invention provides a way to render computer-generated screens/pages for a user based on a user's past history of screens visited.

2. Related Art

As the use of computer networks grows, greater demands are being placed on client-host relationships. For example, it is often the case that a client will communicate with a host to navigate though a sequence of computer-generated screens or pages. Typical examples of hosts include mainframes such as the Telnet 3270 and 5250 servers, which are commercially available from International Business Machines of Armonk, N.Y. In some instances, the client will communicate with the host through a web server. In others, the client will communicate with the host directly. In either scenario, a process known as "screen scraping" often occurs. Specifically, when a user requests a certain screen from the host, screen data will be received. This screen data will then be converted into a format usable by the client. For example, when the client directly communicates with the host, the screen data will be received on the client, and then converted into a GUI format or the like. This distributes the burden of screen scraping to the individual clients. Conversely, when the clients communicate with the host through a web server, the screen data will be converted into HTML or the like on the web server and then sent to the clients. One current product that performs this function on a web server is Host Access Transformation Services (HATS), which is a WebSphere product commercially available from International Business Machines Corp.

Unfortunately, even though communicating through a web server can provide many advantages, the fact that a large number of clients might communicate through a single web server makes scalability and efficiency a problem. Specifically, if the web server has to simultaneously perform screen scraping for multiple clients, an overload condition could occur. To date, no existing solution has been provided that takes advantage of the fact that many users tend to request the same screens over and over again. For example, users who make travel reservations for a company will likely visit the same travel-based screens many times. However, no current system provides a way to recognize the users' navigation pattern, and then use that information to streamline the scraping process.

In view of the foregoing, a need exists for a method, system and program product for learning computer-generated screens based on user key selections. Specifically, a need exists for a system that learns a user's navigation pattern, and then uses that pattern to efficiently render screens in the future. A further need exists for such a system to learn screens based on "aid" keys selected by the user to navigate through the screens.

SUMMARY OF THE INVENTION

In general, the present invention provides a method, system and program product for learning computer-generated screens/pages based on user key selections. Specifically, under the present invention, as a user navigates through a sequence of screens by selecting certain "aid" keys, a graph will be built reflecting the navigation history of the user. The graph associates each selected key with the screen(s) to which selection of the key led the user. To this extent, the graph resembles a hierarchical tree with each node of the tree being associated with a particular key. Since screens can change, selection of the same key might bring the user to different screens in different sessions. As such, a single node might correspond to one or more screens while being associated with the same key. In any event, when a user requests a certain screen by selecting a particular key, screen data is received from the host on a web server. Thereafter, the screen data is compared to the screen data for the previously visited screen (s). If a match is established, it means that the user has visited this screen before, and its data has already been converted into a screen (e.g., scraped). As such, the requested screen need not be re-converted. Rather, the screen can be retrieved from storage and served to the user. If, however, a match cannot be established, the screen data for the requested screen will be converted, stored and served to the user, and the graph will be updated.

A first aspect of the present invention provides a method for learning computer-generated screens based on user key selections, comprising: receiving a selection of a key made by a user; retrieving data for a screen from a host based on the key; accessing a graph that associates keys with sets of previously visited screens; using the graph to attempt to match the data for the screen to data for a previously visited screen; and if a match is established, serving the previously visited screen to the user.

A second aspect of the present invention provides a method for building a graph of computer-generated screens navigated by a user, comprising: receiving selections of keys made by the user to navigate through a sequence of screens; associating the keys with corresponding screens in the sequence of screens; and representing the sequence of screens as nodes in the graph based on the associated keys, wherein each of the nodes is associated with a single key.

A third aspect of the present invention provides a system for learning computer-generated screens based on user key selections, comprising: a selection reception system for receiving a selection of a key made by a user; a data retrieval system for retrieving data for a screen from a host based on the key; a graph management system for maintaining a graph that associates keys with sets of previously visited screens; and a matching system for using the graph to attempt to match the data for the screen to data for a previously visited screen, wherein the previously visited screen is served to the user if a match is established.

A fourth aspect of the present invention provides a graph of computer-generated screens navigated by a user, comprising: a root corresponding to an initial screen presented to the user; and a set of nodes originating from the root, wherein each of the set of nodes corresponds to a set of screens resulting from a selection of a key by the user, and wherein each node is associated with a corresponding key.

A fifth aspect of the present invention provides a program product stored on a recordable medium for learning computer-generated screens based on user key selections, which when executed comprises: program code for receiving a selection of a key made by a user; program code for retrieving data for a screen from a host based on the key; program code for maintaining a graph that associates keys with sets of previously visited screens; and program code for using the graph to attempt to match the data for the screen to data for a previously visited screen, wherein the previously visited screen is served to the user if a match is established.

Therefore, the present invention provides a method, system and program product for learning computer-generated screens based on user key selections.

BRIEF DESCRIPTION OF THE DRAWINGS

These and other features of this invention will be more readily understood from the following detailed description of the various aspects of the invention taken in conjunction with the accompanying drawings in which:

FIG. 3 depicts a graph of screens for a user according to the present invention.

FIG. 4 depicts a method flow diagram according to the present invention.

Figure 1:
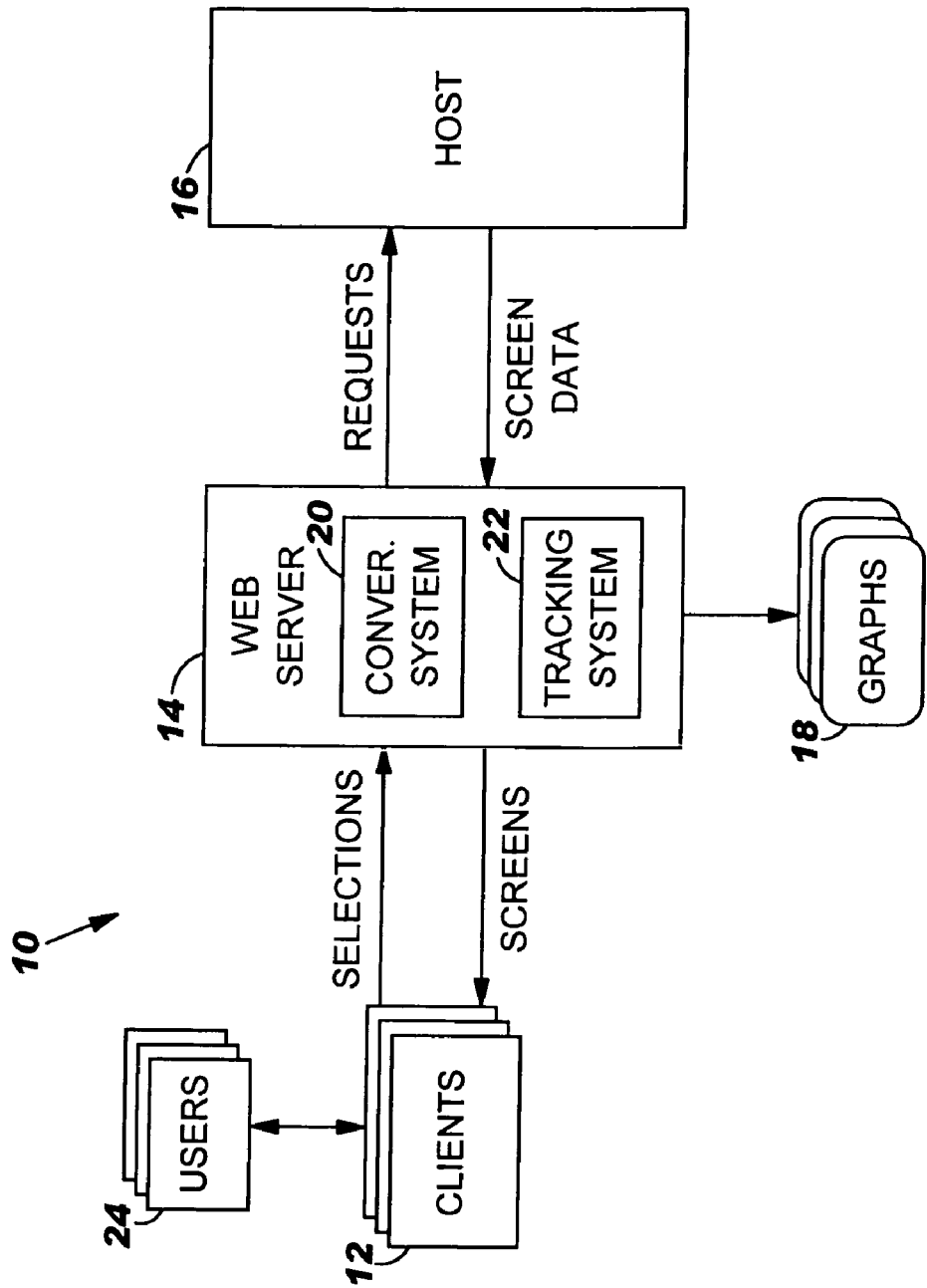
FIG. 1 depicts a system for learning computer-generated screens based on user key selections according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for learning computer-generated screens/pages based on user key selections. Specifically, under the present invention, as a user navigates through a sequence of screens by selecting certain "aid" keys, a graph will be built reflecting the navigation history of the user. The graph associates each selected key with the screen(s) to which selection of the key led the user. To this extent, the graph resembles a hierarchical tree with each node of the tree being associated with a particular key. Since screens can change, selection of the same key might bring the user to different screens in different sessions. As such, a single node might correspond to one or more screens while being associated with the same key. In any event, when a user requests a certain screen by selecting a particular key, screen data is received from the host on a web server. Thereafter, the screen data is compared to the screen data for the previously visited screen(s). If a match is established, it means that the user has visited this screen before, and its data has already been converted into a screen (e.g., scraped). As such, the requested screen need not be re-converted. Rather, the screen can be retrieved from storage and served to the user. If, however, a match cannot be established, the screen data for the requested screen will be converted, stored and served to the user, and the graph will be updated.

It should be understood that as used herein, the term "screen" is intended to refer to any collection of data that can be rendered for a user. Examples of "screens" under the present invention include, among others, interface or web pages. Moreover, as used herein the term "set" is intended to include a quantity of one or more.

Referring now to FIG. 1, a system 10 for learning computer-generated screens based on user key selections is shown. As depicted, system 10 includes clients 12, web server 14 and host 16. In a typical embodiment, users 24 operate clients 12 to request certain screens from host 16 through web server 14. Web server 14 is shown as including conversion system 20 and tracking system 22. Conversion system 20 is intended to represent any type of "screen scraping" product now known or later developed. For example, conversion system 20 can be Host Access Transformation Services as discussed above. Tracking system 22 provides the functionality of the present invention as will be further described below. It should be understood that conversion system 20 and tracking system 22 could be represented as one system/program. For example, tracking system 22 could be a plugin for conversion system 20. They are shown herein as separate systems for illustrative purposes only.

In a typical embodiment, communication between clients 12, web server 14 and host 16 occurs over a network such as the Internet, a local area network (LAN), a wide area network (WAN), a virtual private network (VPN), etc. To this extent, connectivity between clients 12, web server 14 and host 16 could occur via a direct hardwired connection (e.g., serial port), or via an addressable connection that may utilize any combination of wireline and/or wireless transmission methods. Moreover, coventional network connectivity, such as Token Ring, Ethernet, WiFi or other conventional communications standards could be used. Still yet, connectivity could be provided by conventional TCP/IP sockets-based protocol. In this instance, an Internet service provider could be used to establish desired connectivity.

Under the present invention, tracking system 22 will build graphs 18 for each user 24 (or for each set/group of users) that represent a history of screens accessed thereby. The graphs will be further described in detail below, but generally, each graph comprises a hierarchical tree of nodes originating from a root. The root corresponds to an initial screen accessed by a user 24 (e.g., a homepage for a travel-based website). Each node is associated with a particular key that was selected by the user to access another screen (e.g., a screen of flight times). The individual nodes correspond to the one or more screens to which selection of a key led the user. As indicated above, screens can change as can their association with particular keys. Accordingly, a user may be presented with screen "A" when selecting key "1" from a screen "X" during one session, but be presented with screen "B" when selecting key "1" from the same screen during another session. In such a case, the node associated with key "1" from screen "X" will correspond to both screen "A" and screen "B." In any event, as conversion system 20 converts screen data into screens for service to users 24, the present invention will save the screen data and its resulting screen for later use.

Once a graph 18 for a user 24 has been initialized, it will be continually updated over time. Moreover, the graph 18 will be used to optimize the process in which screens are served to users 24/clients 12. Specifically, when a user 24 selects a certain key, the selection will be received on web server 14 from client 12, and data for the requested screen will be received on web server 14 from host 16. Instead of automatically converting the screen data into the requested screen as done in the past, tracking system 22 will access graph 18 for user 24. Then, tracking system 22 will compare the screen data for the requested screen to the screen data for the screen(s) previously visited by the user as identified in graph 18. If a match is established, the screen has been requested and converted in the past. In such a case, the screen will be retrieved from storage and served to user 24 (instead of being re-converted as with previous systems). If a match cannot be established, the screen data will be converted by conversion system 20 and served to user. Then, tracking system 22 will update graph 18 for user 24 to reflect the new screen while saving the screen data and the screen for future use.

As can be seen, the teachings of the present invention can drastically reduce the demands placed on web server 14. Specifically, since numerous clients 12 can request screens through web server 14, reducing the conversion burden placed on web server 14 will greatly increase scalability and performance.

Figure 2:
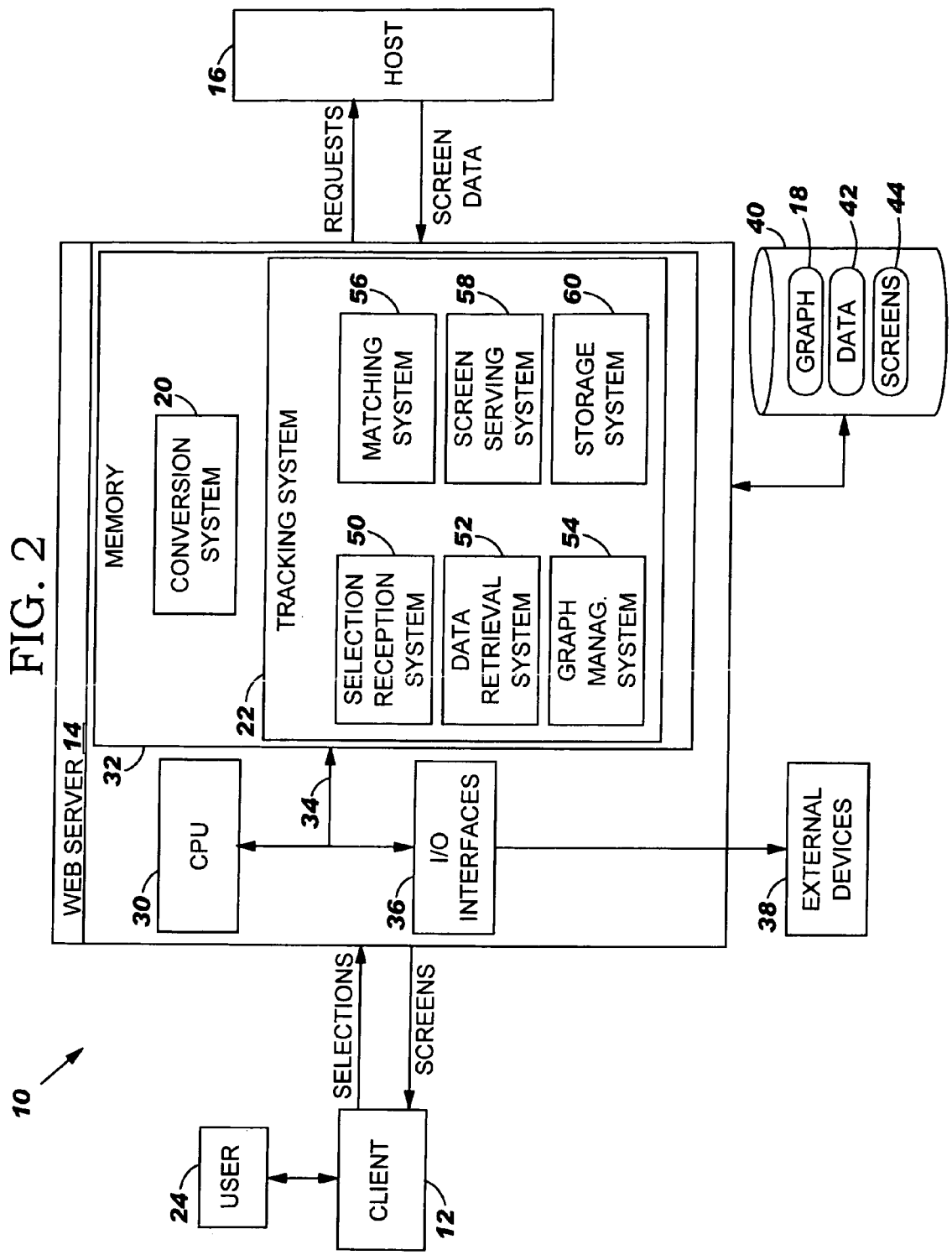
FIG. 2 depicts the system of FIG. 1 in greater detail.

Referring now to FIG. 2, a more detailed diagram of system 10 is shown. As depicted, web server 14 generally comprises central processing unit (CPU) 30, memory 32, bus 34, input/output (I/O) interfaces 36, external devices/resources 38 and storage unit 40. CPU 30 may comprise a single processing unit, or be distributed across one or more processing units in one or more locations, e.g., on a client and server. Memory 32 may comprise any known type of data storage and/or transmission media, including magnetic media, optical media, random access memory (RAM), read-only memory (ROM), a data cache, etc. Moreover, similar to CPU 30, memory 32 may reside at a single physical location, comprising one or more types of data storage, or be distributed across a plurality of physical systems in various forms.

I/O interfaces 36 may comprise any system for exchanging information to/from an external source. External devices/resources 38 may comprise any known type of external device, including speakers, a CRT, LCD screen, handheld device, keyboard, mouse, voice recognition system, speech output system, printer, monitor/display, facsimile, pager, etc. Bus 34 provides a communication link between each of the components in web server 14 and likewise may comprise any known type of transmission link, including electrical, optical, wireless, etc.

Storage unit 40 can be any system (e.g., database, etc.) capable of providing storage for information under the present invention. Such information could include, for example, graphs 18, screen data 42, screens 44, etc. As such, storage unit 40 could include one or more storage devices, such as a magnetic disk drive or an optical disk drive. In another embodiment, storage unit 40 includes data distributed across, for example, a local area network (LAN), wide area network (WAN) or a storage area network (SAN) (not shown). Although not shown, additional components, such as cache memory, communication systems, system software, etc., may be incorporated into web server 14. In addition, it should be appreciated that although not shown, clients 12 and host 16 will likely include computerized components similar to web server 14. Still yet, it should be understood that a single client 12 and user 24 have been shown in FIG. 2 for simplicity purposes only.

Shown in memory 32 of web server 14 are conversion system 20 and tracking system 22. As further shown, tracking system 22 generally comprises selection reception system 50, data retrieval system 52, graph management system 54, matching system 56, screen serving system 58 and storage system 60. In general, as user 24 navigates about sequences of screens, graph management system 54 will construct and maintain a graph 18 reflecting the navigation. Referring to FIG. 3, an illustrative graph 18 is shown in greater detail. As depicted, graph 18 generally comprises a hierarchical tree of nodes 106A-F originating from a root 100. Root 100 typically represents a starting point for user 24 such as an initial screen at which the user 24 begins his/her navigation. Although graph 18 is shown as including two hierarchical levels 102 and 104, it should be understood that this is meant to be illustrative only. In general, each node 106A-F is associated with a particular "aid" key. Specifically, each node 106A-F is associated with the keystroke that was selected by the user 24 to navigate to a certain screen. Moreover, each node corresponds to one or more screens that were visited by the user upon selecting the associated key. For example, node 106C is shown as being associated with key "3." Moreover, node 106C corresponds to screens "A-C." This means that in all the times the user 24 selected key "3" from root 100, the user 24 was presented with three different screens A-C. This indicates that the screens presented to a user 24 can change over time such that even though the user 24 might select the same key from the same screen, the user could be presented with a different screen.

In any event, in cases where a node corresponds to more than one screen, graph management system 54 (FIG. 2) will typically place the screens in an order based on a frequency of previous occurrences. For example, if during the past 17 times that key "3" was selected from root 100, screen "A" was presented 5 times, screen "B" was presented 10 times, while screen "C" was presented 2 times, screens A-C could actually be placed in the following order within node:

B-A-C

Regardless, under the present invention graph 18 as well as the screen data and the converted screens represented in graph 18 will be stored (e.g., in storage unit 40) by storage system 60 (FIG. 2) for future access by tracking system 22 (FIG. 2).

Referring back to FIG. 2, once graph 18 for user 24 has been initially established, it will not only be updated as user 24 continues to navigate through screens, but it will also be used to reduce the processing load on web server 14. Specifically, assume that graph 18 has been constructed for user 24 as shown in FIG. 3. Further, assume that user 24 later selects a key to request a certain screen. The key selection will be received by selection reception system 50. Upon receipt, data retrieval system 52 will communicate with host 16 to retrieve the screen data for the requested screen. Once received, graph management system 54 will access graph 18. Matching system 56 will then attempt to match the screen data for the requested screen to screen data for a previously visited screen.

In a typical embodiment, matching system 56 will perform the matching by attempting to match fields and attribute strings contained within the sets of screen data. Moreover, matching system 56 will typically start by attempting to match the screen data for the requested screen to screen data for previously visited screens associated with the selected key. For example, if user 24 now selects key "3" from the initial screen, matching system 56 will first compare the screen data for the requested screen to the screen data 42 for screens "A-C" (e.g., as stored in storage unit 40 or in cache) of node 106C (FIG. 3). In performing the matching operation, matching system 56 can compare the sets of screen data according to the order in which the screens are contained within node 106C (e.g., B-A-C). If a match cannot be established, matching system 56 can widen the matching process to include the other nodes of graph 18 (e.g., the entire "neighborhood"). If a match can be established at some point, the screen being requested by user 24 has already been converted (e.g., scraped) and it need not be converted again. In such a case, the screen will be retrieved from storage unit 40 (or cache) and served to user 24 via screen serving system 58.

If a match cannot be established, however, the requested screen will be considered to be a new screen. As such, conversion system 20 will convert the screen data thereof into the requested screen and serve the same to user 24 (or screen serving system 58 could perform the service operation). Under the present invention, when a new screen is converted, storage system 60 will store the screen and its underlying data in storage unit 40 for future use. In addition, graph management system 54 will update the graph 18 accordingly. For example, if selection of key "3" from the initial screen resulted in a new screen "D," node 106C (FIG. 3) will be updated to include screen "D." Similarly, if user 24 had selected a new key (e.g., key "4") from the initial screen, graph management system 54 would update graph 18 to include a new node that is adjacent to node 106C on hierarchical level 102 (FIG. 3). It could even be the case that the new key led to an existing screen (e.g., screen "C"). In such a case, both node 106C and the new node could include/correspond to screen "C." Alternatively, screen "C" could be represented in only node 106C until the new key leads to screen "C" a certain number of times.

It should be appreciated that screen serving system 58 shown in tracking system 22 is optional. To this extent, the present invention could rely on conversion system 20 to serve screens whether they are newly converted or retrieved from storage unit 40. In addition, it should be understood that graphs 18, screen data 42 and screens 44 need not be stored in storage unit 40, rather, such items could be stored in cache memory.

It should be understood that the process of construction of a graph from navigation patterns could be based on the navigation patterns of a single user such as user 24, or for a group of users. It should also be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Referring now to FIG. 4, a method flow diagram 200 according to the present invention is shown. As depicted, first step S1 is to receive a selection of a key made by a user. Second step S2 is to retrieve data for a screen from a host based on the key. Third step S3 is to access a graph that associates keys with sets of previously visited screens. Fourth step S4 is to use the graph to attempt to match the data for the screen to data for a previously visited screen. As indicated above, the matching can start with the screens corresponding to the node in the graph associated with the selected key, and then be widened to include other nodes in the graph if no match is initially established. If at any time a match is established, the matching screen will be served to the user in step S5. However, if a match could not be established in step S4, the screen data for the requested screen could be converted in step S6. In step S7, the graph would be updated, and the new screen and its data would be stored. Then in step S8, the new screen would be served to the user.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the depiction of tracking system 22 is intended to be illustrative only. That is, tracking system 22 could be represented by a different configuration of systems.

We claim:

1. A method for managing conversions of screen data generated by a host based on key selections, comprising:
   receiving a selection of a key made while a particular screen is visited from a client device, the key being one of a plurality of keys selectable from a keyboard of the client device and the key selection indicating a request to visit a different screen;
   retrieving screen data for the different screen from a host;
   accessing a graph to determine whether the retrieved screen data for the different screen has already been converted into a display format usable by the client device, wherein:
      the graph comprises a hierarchical tree of nodes originating from a root node;
      the root node represents an initial screen visited from the client device;
      each one of the nodes except the root node is associated with one of the plurality of selectable keys and represents one or more screens which were previously visited by selecting the associated one of the selectable keys while visiting a screen represented by a parent of the node; and
      if the hierarchical tree contains a node associated with the selected key and for which the particular visited screen is represented by the parent of the contained node, concluding that the retrieved screen data for the different screen has already been converted into the display format if the retrieved screen data matches screen data corresponding to any of the one or more screens represented by the contained node; and
   if the accessing concludes that the retrieved screen data for the different screen has already been converted into the display format, serving, as the requested different screen, the previously visited screen to which the matched screen data corresponds without performing a conversion of the retrieved screen data.

2. The method of claim 1, wherein:
   at least one of the nodes represents a plurality of screens; and
   for each of the at least one nodes, the screens are represented within the node in an order that is based on a frequency of previously visiting each of the screens represented within the node by selecting the key associated with the node while visiting the screen represented by the parent of the node.

3. The method of claim 1, wherein the selection of the key is received on a web server from the client device, and wherein the retrieved screen data for the different screen is retrieved on the web server from the host.

4. The method of claim 1, wherein the concluding that the retrieved screen data for the different screen has already been converted into the display format further comprises determining whether fields and attribute strings in the retrieved screen data match corresponding fields and attribute strings in the screen data corresponding to any of the one or more screens represented by the contained node.

5. The method of claim 1, wherein the selected key is an aid key.

6. The method of claim 1, wherein the display format usable by the client device comprises a Web page.

7. The method of claim 1, wherein the retrieved data comprises a host data format not displayable by the client device without conversion into the display format usable by the client device.

8. The method of claim 1, wherein the host is a legacy host.

9. The method of claim 1, further comprising:
if the accessing does not conclude that the retrieved screen data for the different screen has already been converted into the display format, then performing the conversion of the retrieved screen data into the display format, storing a result of the conversion as a new screen to which the retrieved screen data corresponds, serving the new screen as the requested different screen, and updating the graph to represent the new screen as a previously visited screen.

10. The method of claim 9, wherein updating the graph to represent the new screen as a previously visited screen comprises:
updating the contained node to also represent the new screen when the retrieved screen data for the different screen does not match the screen data corresponding to any of the one or more screens represented by the contained node; and
adding a new node to the hierarchical tree when the hierarchical tree does not contain any node associated with the selected key and for which the particular visited screen is represented by the parent of the contained node, the new node being associated with the selected key and representing the new screen.

11. The method of claim 1, wherein the graph represents screens visited from the client device by a particular user and converted into the display format for serving to the client device for the particular user.

12. The method of claim 1, wherein the graph represents screen data retrieved by a group of users, and converted into the display format for serving to client devices for the users in the group.

13. A method for managing conversions of screen data obtained from a host, comprising:
receiving selections of keys made to navigate through a sequence of screens on a client device, the keys being aid keys selectable from a keyboard of the client device; and
managing conversions of screen data obtained from a host into screens in a display format usable by the client device by building a hierarchical tree that contains a plurality of nodes originating from a root node that represents an initially-visited one of the screens, wherein:
each of the nodes represents one or more of the screens in the sequence; and
for each one of the nodes except the root node, one of the selected keys is associated therewith and the one or more screens represented by the node were navigated to by selecting the associated key while visiting a screen represented by a parent of the node;
responsive to receiving each of the key selections, determining which of the screens in the sequence is currently visited and obtaining screen data for a different one of the screens in the sequence from the host, the different one being indicated by the key selection and the currently-visited screen;
the hierarchical tree indicates that the obtained screen data for the different one of the screens has already been converted into the display format if the obtained screen data matches screen data corresponding to any of the one or more screens represented by a particular node contained within the tree, wherein the selected key is associated with the particular node and the parent of the particular node represents the currently-visited screen; and
when the hierarchical tree indicates that the obtained screen data for the different one of the screens has not already been converted into the display format, converting the obtained screen data into the display format and updating the hierarchical tree to indicate that the obtained screen data for the different one of the screens has been converted into the display format.

14. The method of claim 13, wherein the selections are received on a web server from the client device.

15. The method of claim 14, wherein the web server communicates with the host to obtain the screen data for the screens in the sequence.

16. The method of claim 13, wherein:
at least one of the nodes represents a plurality of the screens in the sequence; and
for each of the at least one nodes, the screens are represented within the node in an order that is based on a frequency of previously navigating to each of the screens represented within the node by selecting the key associated with the node while visiting the screen represented by the parent of the node.

17. The method of claim 13, wherein the screens in the sequence comprise 3270 screens or 5250 screens.

18. A system for managing conversions of screen data generated by a host based on key selections, comprising:
a computer comprising a processor; and
instructions which execute, using the processor, to perform functions comprising:
receiving a selection of a key made while a particular screen is visited from a client device, the key being one of a plurality of keys selectable from a keyboard of the client device and the key selection indicating a request to visit a different screen;
retrieving screen data for the different screen from a host;
accessing a graph to determine whether the retrieved screen data for the different screen has already been converted into a display format usable by the client device, wherein:
the graph comprises a hierarchical tree of nodes originating from a root node;
the root node represents an initial screen visited from the client device;
each one of the nodes except the root node is associated with one of the plurality of selectable keys and represents one or more screens which were previously visited by selecting the associated one of the selectable keys while visiting a screen represented by a parent of the node; and
if the hierarchical tree contains a node associated with the selected key and for which the particular visited screen is represented by the parent of the contained node, concluding that the retrieved screen data for the different screen has already been converted into the display format if the retrieved screen data matches screen data corresponding to any of the one or more screens represented by the contained node; and
if the accessing concludes that the retrieved screen data for the different screen has already been converted into the display format, serving, as the requested different screen, the previously visited screen to which the matched screen data corresponds without performing a conversion of the retrieved screen data.

19. The system of claim 18, wherein:
at least one of the nodes represents a plurality of screens; and
for each of the at least one nodes, the screens are represented within the node in an order that is based on a frequency of previously visiting each of the screens represented within the node by selecting the key associated with the node while visiting the screen represented by the parent of the node.

20. The system of claim 18, wherein the selection of the key is received on a web server from the client device, and wherein the retrieved screen data for the different screen is retrieved on the web server from the host.

21. The system of claim 18, wherein the concluding that the retrieved screen data for the different screen has already been converted into the display format further comprises determining whether fields and attribute strings in the retrieved screen data match corresponding fields and attribute strings in the screen data corresponding to any of the one or more screens represented by the contained node.

22. The system of claim 18, wherein the selected key is an aid key.

23. The system of claim 18, the functions further comprising:
if the accessing does not conclude that the retrieved screen data for the different screen has already been converted into the display format, then performing the conversion of the retrieved screen data into the display format, storing a result of the conversion as a new screen to which the retrieved screen data corresponds, serving the new screen as the requested different screen, and updating the graph to represent the new screen as a previously visited screen.

24. The system of claim 23, wherein updating the graph to represent the new screen as a previously visited screen comprises:
updating the contained node to also represent the new screen when the retrieved screen data for the different screen does not match the screen data corresponding to any of the one or more screens represented by the contained node; and
adding a new node to the hierarchical tree when the hierarchical tree does not contain any node associated with the selected key and for which the particular visited screen is represented by the parent of the contained node, the new node being associated with the selected key and representing the new screen.

25. A computer program product for managing conversions of screen data generated by a host based on key selections, the computer program product embodied on at least one computer-readable storage media and comprising computer-readable program code for:
receiving a selection of a key made while a particular screen is visited from a client device, the key being one of a plurality of keys selectable from a keyboard of the client device and the key selection indicating a request to visit a different screen;
retrieving screen data for the different screen from a host;
accessing a graph to determine whether the retrieved screen data for the different screen has already been converted into a display format usable by the client device, wherein:
the graph comprises a hierarchical tree of nodes originating from a root node;
the root node represents an initial screen visited from the client device;
each one of the nodes except the root node is associated with one of the plurality of selectable keys and represents one or more screens which were previously visited by selecting the associated one of the selectable keys while visiting a screen represented by a parent of the node; and
if the hierarchical tree contains a node associated with the selected key and for which the particular visited screen is represented by the parent of the contained node, concluding that the retrieved screen data for the different screen has already been converted into the display format if the retrieved screen data matches screen data corresponding to any of the one or more screens represented by the contained node; and
if the accessing concludes that the retrieved screen data for the different screen has already been converted into the display format, serving, as the requested different screen, the previously visited screen to which the matched screen data corresponds without performing a conversion of the retrieved screen data.

26. The computer program product of claim 25, wherein:
at least one of the nodes represents a plurality of screens; and
for each of the at least one nodes, the screens are represented within the node in an order that is based on a frequency of previously visiting each of the screens represented within the node by selecting the key associated with the node while visiting the screen represented by the parent of the node.

27. The computer program product of claim 25, wherein the selection of the key is received on a web server from the client device, and wherein the retrieved screen data for the different screen is retrieved on the web server from the host.

28. The computer program product of claim 25, wherein the concluding that the retrieved screen data for the different screen has already been converted into the display format further comprises determining whether fields and attribute strings in the retrieved screen data match corresponding fields and attribute strings in the screen data corresponding to any of the one or more screens represented by the contained node.

29. The computer program product of claim 25, wherein the selected key is an aid key.

30. The computer program product of claim 25, further comprising computer-readable program code for:
if the accessing does not conclude that the retrieved screen data for the different screen has already been converted into the display format, then performing the conversion of the retrieved screen data into the display format, storing a result of the conversion as a new screen to which the retrieved screen data corresponds, serving the new screen as the requested different screen, and updating the graph to represent the new screen as a previously visited screen.

31. The computer program product of claim 30, wherein updating the graph to represent the new screen as a previously visited screen comprises:
updating the contained node to also represent the new screen when the retrieved screen data for the different screen does not match the screen data corresponding to any of the one or more screens represented by the contained node; and
adding a new node to the hierarchical tree when the hierarchical tree does not contain any node associated with the selected key and for which the particular visited screen is represented by the parent of the contained node, the new node being associated with the selected key and representing the new screen.

* * * * *